United States Patent
[15] 3,706,947
Jedrychowski et al.
[45] Dec. 19, 1972

[54] VARIABLE PHASE EQUALIZER

[72] Inventors: Jerzy L. Jedrychowski, Foxboro; Peter Robinson, Needham Heights, both of Mass.

[73] Assignee: Raytheon Company, Lexington, Mass.

[22] Filed: Dec. 7, 1970

[21] Appl. No.: 95,943

Related U.S. Application Data

[63] Continuation of Ser. No. 821,188, April 2, 1969, abandoned.

[52] U.S. Cl.......................333/28 R, 333/10, 333/11, 333/29, 333/31 R

[51] Int. Cl...........H03h 7/34, H03h 7/36, H01p 5/14

[58] Field of Search.............333/11, 10, 28, 29, 31 R

[56] References Cited

UNITED STATES PATENTS

| | | | |
|---|---|---|---|
| 2,630,474 | 3/1953 | Brown | 324/95 X |
| 2,630,475 | 3/1953 | Woodward, Jr. | 324/95 X |
| 3,136,950 | 6/1954 | Mackey | 325/138 |
| 3,441,879 | 4/1969 | Tomcavage | 333/28 |

OTHER PUBLICATIONS

Jakes, Jr., Broad Band Matching with a Directional Couper in Proc. of the RE, Vol. 40, issue Oct. 10 1952; pages 1216–1218.
The International Dictionary of Physics and Electronics, Van ostrand, Princeton, N.J. 1961. QC5I5; Title Page and page 67.

*Primary Examiner*—Herman Karl Saalbach
*Assistant Examiner*—Marvin Nussbaum
*Attorney*—Harold A. Murphy and Joseph D. Pannone

[57] ABSTRACT

A variable phase equalizer employing a hybrid network wherein one of the pairs of opposite hybrid terminations is used as input and output and the second pair of hybrid terminations has a variable reactance in one arm and a resistance in the opposite arm. This equalizer has the advantage that its insertion loss is constant, independently of the reactive components to be varied within the range provided with no restriction on the value selected.

7 Claims, 3 Drawing Figures

PATENTED DEC 19 1972

3,706,947

INVENTORS
JERZY L. JEDRYCHOWSKI
PETER ROBINSON
BY Irving S. Rappaport
ATTORNEY

VARIABLE PHASE EQUALIZER

This application is a continuation of application, Ser. No. 821,188, filed May 2, 1969, now abandoned.

BACKGROUND OF THE INVENTION

Phase equalizers are used for compensating phase distortion in transmission systems. They find application in radio relays for both commercial and military communications equipment. The following description concerns a type of phase equalizer which employs a hybrid network. Hybrid is generally understood to be a network containing four terminal pairs or four ports grouped in two pairs of opposite terminal pairs or port pairs. When one such pair is terminated with matching impedances, the other pair passes through its maximum insertion loss and, for practical purposes, isolates the output from the input.

Existing phase equalizer designs, which employed hybrid networks contain variable reactances in both opposite arms. To vary the phase characteristic, while holding the insertion loss constant, it is necessary to vary simultaneously two components. The values of such two components are rigidly interrelated, with their product being held constant throughout the whole range of variation. In practice, this makes a variable phase equalizer difficult to design and restricts its range of operation. Such equalizers, among others, are described in U.S. Pat. No. 3,277,403. In addition, prior art equalizers do not compensate adequately for parasitic properties of the network.

In the present invention, the variable phase equalizer has two opposite terminal pairs in which one pair of opposite hybrid terminations is used as input and output terminals. The second pair has a variable reactance in one arm and a resistance in the opposite arm. This type of equalizer has the important advantage that its insertion loss is constant, independently of the reactance values chosen in the variable arm. Thus, the reactive components can be varied individually within the range provided with no restriction on the values selected. It is sufficient to observe only the resulting phase characteristics.

While the phase of the network varies with the insertion loss remaining constant, the input and output impedances are varying simultaneously. Such varying impedances might be permitted in special cases but generally the phase equalizer according to this invention will be preceded and followed by buffer amplifiers.

SUMMARY OF THE INVENTION

The above objects and advantages of the present invention as well as others, are achieved by providing a variable phase equalizer, said equalizer having a constant insertion loss independently of the variance of any reactive components of the equalizer, said equalizer comprising a hybrid network having two opposite pairs of hybrid terminations; one of said opposite pairs providing input and output terminals; the other of said opposite pairs having a variable reactance in one arm and a resistance in the opposite arm, whereby variance of reactance varies the phase characteristic without affecting the amplitude versus frequency characteristic of the equalizer.

DESCRIPTION OF THE PREFERRED EMBODIMENTS

Figure 1:
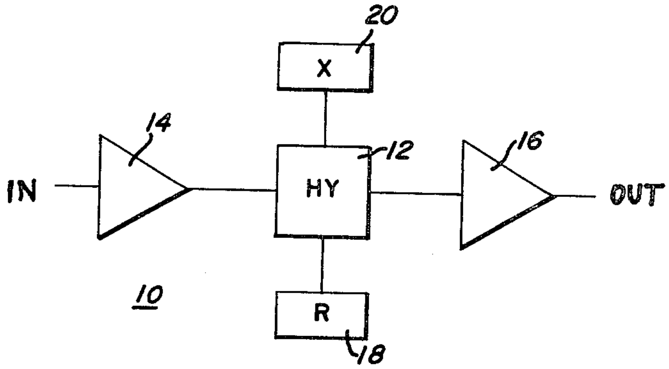
FIG. 1 shows a block diagram of the general form of the network of the present invention.

The hybrid network of the present invention can be built using a balanced transformer, a transmission line type transformer or a directional coupler in stripline or waveguide. FIG. 1 shows the general form of the variable phase equalizer network 10 of the present invention. The network includes a hybrid 12 with two pairs of opposite terminal pairs. One pair of opposite hybrid terminations includes an input terminal consisting of a buffer amplifier 14 and an output terminal consisting of a buffer amplifier 16. The second pair of hybrid terminations includes a resistive arm 18 and a reactive arm 20.

Figure 2:
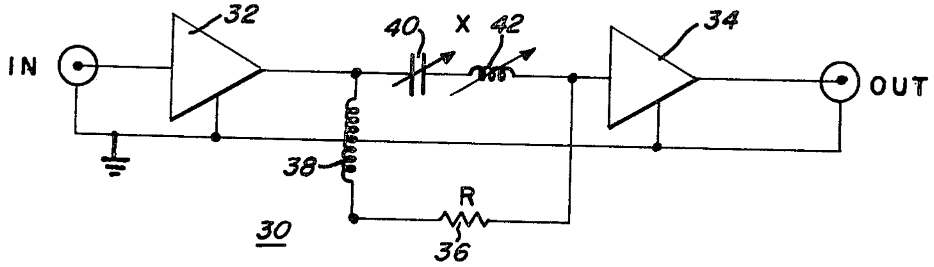
FIG. 2 shows an auto-transformer version of the network shown in FIG. 1.

FIG. 2 shows an auto-transformer version 30 of the variable phase equalizer shown in FIG. 1. Buffer amplifiers 32 and 34 are provided as input and output hybrid terminals respectively. The auto-transformer which is the essential element of the hybrid termination is provided by a coil 38. The resistive arm includes a resistance 36 which may have in series a fixed inductance (not shown) which compensates for parasitic properties of the network. The value of resistance 36 is prescribed by the network's characteristic impedance. The reactive arm includes a variable capacitance 40 in series with a variable inductance 42. There is considerable latitude in the values of capacitance 40 and inductance 42 depending on the range of phase equalization desired.

Figure 3:
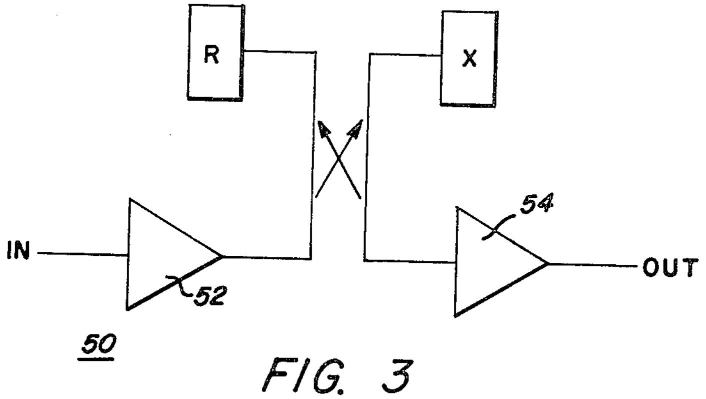
FIG. 3 shows a directional coupler version of the network shown in FIG. 1.

FIG. 3 shows a directional coupler version 50 of the variable phase equalizer shown in FIG. 1. In this version, buffer amplifiers 52 and 54 are provided at the input and output terminals.

A description of the operation of the phase equalizers in FIGS. 1 – 3 will now be presented. An input signal received by input amplifier 14 is acted upon by the hybrid 12 such as to produce two signals identical in amplitude and opposite in phase in the two arms 18 and 20. The signal is partially absorbed in the resistive arm 18 and is reflected in the reactive arm 20. The presence of the R in the resistive arm 18 produces constant amplitude of the input signal the varying phase of which is produced by the X of the reactive branch 20. Within the operating passband of the network, the output signal from amplifier 16 remains constant while the phase varies in the prescribed manner with the varying frequency.

The operation of the equalizers 30 and 50 shown in FIGS. 2 and 3 are basically the same. In FIG. 2 when the coil 38 is excited it produces two signals identical in amplitude and opposite in phase in the two arms.

We claim:

1. In combination:

hybrid means having two opposite pairs of hybrid arms, said arms extending outwardly from a central portion of said hybrid means, an arm of one of said pairs being located between the two arms of the opposite pair, the power provided by an arm of one pair being coupled equally to the two arms of the other pair;

one of said pairs of hybrid arms providing a signal input arm and a signal output arm;

means for supplying multifrequency signals to said signal input arm;

means fed by said signal output arm for utilizing at least some of said multifrequency signals; and the other of said pairs of hybrid arms having an adjustable reactance presenting a substantially reactive impedance to at least some of said signal frequencies in one arm and a resistance to substantially all of said signal frequencies in the other arm.

2. The combination in accordance with claim 1 wherein said signal supply means comprises an impedance buffer.

3. The combination in accordance with claim 1 wherein said resistance is substantially prescribed by the characteristic impedance of said network.

4. The combination in accordance with claim 1 wherein said hybrid means is a directional coupler.

5. The combination in accordance with claim 1 wherein said adjustable reactance comprises a variable capacitance and variable inductance.

6. In combination:

hybrid means having two opposite pairs of hybrid arms; one of said pairs of hybrid arms providing a signal input arm and a signal output arm;

means for supplying multifrequency signals to said signal input arm;

means fed by said signal output arm for utilizing at least some of said multifrequency signals;

the other of said pairs of hybrid arms having an adjustable reactance presenting a substantially reactive impedance to at least some of said signal frequencies in one arm and a resistance to substantially all of said signal frequencies in the other arm; and the signal energy fed from said input through said hybrid means to said resistance being substantially absorbed by said resistance and the signal energy fed to said reactance through said hybrid means is substantially reflected to produce a phase versus frequency characteristic of said signal at said output arm which is altered by variation by said adjustable reactance without substantial alteration of the amplitude versus frequency characteristic of said output signal.

7. The combination in accordance with claim 6 wherein said resistance is substantially prescribed by the characteristic impedance of said network.

* * * * *